US008270374B2

(12) United States Patent
Cai et al.

(10) Patent No.: US 8,270,374 B2
(45) Date of Patent: Sep. 18, 2012

(54) DETERMINING LINK QUALITY FOR NETWORKS HAVING RELAYS

(75) Inventors: Zhijun Cai, Irving, TX (US); Rose Qingyang Hu, Irving, TX (US); Yi Yu, Irving, TX (US); Andrew Mark Earnshaw, Kanata (CA); Yi Song, Irving, TX (US); Mo-Han Fong, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 327 days.

(21) Appl. No.: 12/572,949

(22) Filed: Oct. 2, 2009

(65) Prior Publication Data

US 2011/0081903 A1 Apr. 7, 2011

(51) Int. Cl.
*H04W 4/00* (2009.01)

(52) U.S. Cl. .................................. 370/332; 370/252

(58) Field of Classification Search ............... 370/310.2, 370/328, 331, 332, 338, 349, 252
See application file for complete search history.

(56) References Cited

U.S. PATENT DOCUMENTS

| 7,127,253 | B2 * | 10/2006 | Chen .................. 455/449 |
| 7,493,120 | B2 * | 2/2009 | Kim et al. ........... 455/436 |
| 2002/0173310 | A1 | 11/2002 | Ebata et al. |
| 2006/0056365 | A1 | 3/2006 | Das et al. |
| 2006/0058038 | A1 | 3/2006 | Das et al. |
| 2007/0010271 | A1 | 1/2007 | Roy |
| 2008/0080436 | A1 | 4/2008 | Sandhu et al. |
| 2009/0047954 | A1 * | 2/2009 | Tenny et al. ............... 455/435.3 |
| 2009/0264123 | A1 | 10/2009 | Agashe et al. |
| 2010/0159991 | A1 | 6/2010 | Fu et al. |

FOREIGN PATENT DOCUMENTS

| KR | 20080025070 A | 3/2008 |
| KR | 20090093951 A | 9/2009 |
| WO | 2006138122 A2 | 12/2006 |
| WO | 2008057669 A2 | 5/2008 |

OTHER PUBLICATIONS

Korean Office Action; Application No. 10-2010-0096529; Sep. 1, 2011; 12 pages.
Cai, Zhijun, et al.; U.S. Appl. No. 12/572,927, filed Oct. 2, 2009; Title: Relay Backhaul Link Quality Considerations for Mobility Procedures.
3GPP TS 36.300v8.9.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; Release 8; Jun. 2009; 159 pgs.
3GPP TS 36.304v8.6.0; 3rd Generation Partnership Project; Technical Specification Group Radio Access Network; Evolved Universal Terrestrial Radio Access (E-UTRA); User Equipment (UE) Procedures in Idle Mode; Release 8; Jun. 2009; 30 pgs.

(Continued)

*Primary Examiner* — Brenda H Pham
(74) *Attorney, Agent, or Firm* — Conley Rose, P.C.; J. Robert Brown, Jr.

(57) ABSTRACT

A device configured to calculate a cell quality ranking criterion for a measured cell, wherein calculating is performed by taking into account at least a signal quality of a backhaul link between a relay node (RN) and an access node. The device may be one of a user equipment (UE), RN, an access node, and a component in a network.

29 Claims, 3 Drawing Sheets

OTHER PUBLICATIONS

3GPP TS 36.331v8.6.0; 3rd Generation Partnership Project; Technical Specification Group Radio Access Network; Evolved Universal Terrestrial Radio Access (E-UTRA) Radio Resource Control (RRC); Protocol Specification; Release 8; Jun. 2009; 207 pgs.

3GPP TS 36.213v8.7.0; 3rd Generation Partnership Project; Technical Specification Group Radio Access Network; Evolved Universal Terrestrial Radio Access (E-UTRA); Physical Layer Procedures; Release 8; May 2009; 77 pgs.

3GPP TR 36.814v0.4.1; 3rd Generation Partnership Project; Technical Specification Group Radio Access Network; Further Advancements for E-UTRA Physical Layer Aspects; Release 9; Feb. 2009; 31 pgs.

Research in Motion UK Limited; Title: Type-II Relay Reference Signal Transmission and UE Association; R1-092419; 3GPP TSG RAN WG1 Meeting #57bis; Los Angeles, USA; Jun. 29-Jul. 3, 2009; 4 pgs.

Extended European Search Report; Application No. 10184537.8; Jan. 25, 2011; 10 pgs.

3GPP TSG RAN WG2 #70; "Issues on Cell Selection/Reselection in Type 1 Relay System"; Hitachi, Ltd.; May 10-14, 2010; 3 pgs.; R2-103096; Montreal, Canada.

3GPP TSG RAN WG1 #59; "Serving Cell Selection in a Heterogeneous Network with Type 1 Relay"; Research in Motion, UK Limited; Nov. 9-13, 2009; 3 pgs; R1-094463; Jeju, Korea.

3GPP TSG-RAN WG1 #56; "Measurements in Support of LTE-A Techniques"; Qualcomm Europe; Feb. 9-13, 2009; 2 pgs.; R1-090859; Athens, Greece.

3GPP TS 36.304 V9.0.0; 3rd Generation Partnership Project; Technical Specification Group Radio Access Network; Evolved Universal Terrestrial Radio Access (E-UTRA); User Equipment (UE) Procedures in Idle Mode; Release 9; Sep. 2009; 30 pgs.

Extended European Search Report; Application No. 10184468.6; Feb. 4, 2011; 7 pgs.

Teyeb, Oumer, et al.; "Handover Framework for Relay Enhanced LTE Networks"; IEEE; 2009; 5 pages.

ETSI TS 136 304 V8.2.0; LTE; Evolved Universal Terrestrial Radio Access (E-UTRA); User Equipment (UE) Procedures in Idle Mode (3GPP TS 36.304 version 8.2.0 Release 8); Nov. 2008; 29 pages.

Zheng, Kan, et al.; "Multihop Cellular Networks Toward LTE-Advanced"; IEEE Vehicular Technology Magazine; Sep. 2009; 8 pages.

European Examination Report; Application No. 10184468.6; Jan. 19, 2012; 6 pages.

Japanese Office Action; Application No. 2010-225224; Jan. 24, 2012; 7 pages.

Japanese Office Action; Application No. 2010-225222; Jan. 24, 2012; 7 pages.

Office Action dated Apr. 5, 2012; U.S. Appl. No. 12/572,927, filed Oct. 2, 2009; 31 pages.

European Examination Report; Application No. 10184537.8; Dec. 7, 2011; 6 pgs.

Korean Office Action; Application No. 10-2010-0096531; Dec. 14, 2011; 8 pgs.

Final Office Action dated Jun. 28, 2012; U.S. Appl. No. 12/572,927, filed Oct. 2, 2009; 23 pages.

European Examination Report; Application No. 10184537.8; Jun. 13, 2012; 5 pages.

Australian Examination Report; Application No. 2010226889; Jul. 27, 2012; 3 pages.

\* cited by examiner

DETERMINING LINK QUALITY FOR NETWORKS HAVING RELAYS

BACKGROUND

As used herein, the terms "device," "user equipment," and "UE" might in some cases refer to mobile devices such as mobile telephones, personal digital assistants, handheld or laptop computers, Blackberry® devices, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A system might be an Evolved Universal Terrestrial Radio Access Network (E-UTRAN) and include an E-UTRAN node B (or eNB), a wireless access point, or a similar component rather than a traditional base station. As used herein, the term "access node" refers to any component of the wireless network, such as a traditional base station, a wireless access point, or an LTE or LTE-A node B or eNB, that creates a geographical area of reception and transmission coverage allowing a UE or a relay node to access other components in a telecommunications system. In this document, the term "access node" and "access device" may be used interchangeably, but it is understood that an access node may comprise a plurality of hardware and software.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
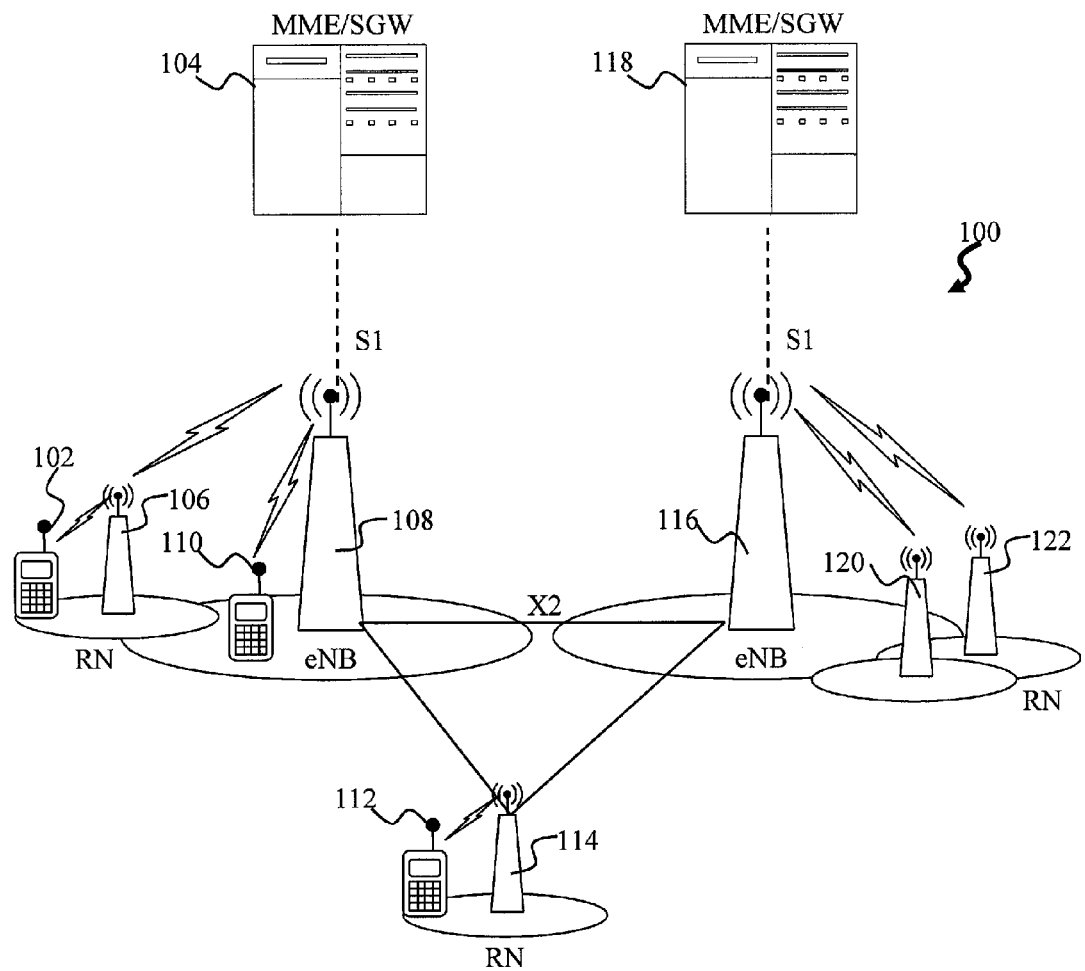
FIG. 1 is a diagram of a communication system, according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used throughout the specification, claims, and Figures, the following terms have the following definitions. Unless stated otherwise, all terms are defined by and follow the standards set forth by the Third Generation Partnership Program (3GPP) technical specifications.

"ACK" is defined as "Acknowledgment," such as an acknowledgement signal.

"BCCH" is defined as "Broadcast Control Channel."

"CQI" is defined as "Channel Quality Indicator."

"EPC" is defined as "Enhanced Packet Core."

"E-UTRA" is defined as "Evolved Universal Terrestrial Radio Access."

"E-UTRAN" is defined as "Evolved Universal Terrestrial Radio Access Network."

"HARQ" is defined as "Hybrid Automatic Repeat Request."

"IE" is defined as "Information Element" "LTE" is defined as "Long Term Evolution," which refers to a set of wireless communication protocols, systems, and/or software.

"LTE-A" is defined as "Long Term Evolution, Advanced," which refers to a set of wireless communication protocols, systems, and/or software newer than LTE.

"MCS" is defined as "Modulation and Coding Scheme."

"MME" is defined as "Mobility Management Entity."

"NAS" is defined as "Non Access Stratum."

"PLMN" is defined as "Public Land Mobile Network."

"PRACH" is defined as "Physical Random Access Channel."

"RAN" is defined as "Radio Access Network."

"RAT" is defined as "Radio Access Technology."

"RF" is defined as "Radio Frequency."

"RN" is defined as "Relay Node."

"RRC" is defined as "Radio Resource Control."

"RSRP" is defined as "Reference Signal Received Power."

"RSRQ" is defined as "Reference Signal Received Quality."

"SIB" is defined as "System Information Block."

"SGW" is defined as "Serving Gateway."

"SNR" is defined as "Signal to Noise Ratio."

"SR" is defined as "Scheduling Request."

"TAU" is defined as "Tracking Area Update."

"Un" is defined as the interface between the RN and the donor eNB.

"Uu" is defined as the interface between a UE and an RN.

The embodiments described herein relate to techniques for improving UE mobility procedures in at least a Type 1 relay network. Specifically, the embodiments provide for taking into account composite, end-to-end signal to noise ratios with respect to RNs and corresponding access nodes when performing a mobility procedure. Mobility procedures include cell selection, cell reselection, and/or handover procedures for a UE.

In networks without RNs, normally only one wireless connection is established before communications reach the remaining wired portion of the network, which might be an EPC. In the following description, we use the EPC as an example. However, other types of the core networks are possible as well. The one wireless connection is typically the wireless link between the UE and the access node, such as an eNB. The connection between the access node and the EPC is usually hard wired and has good transmission characteristics, e.g., much lower bit error rate and consistent channel conditions.

However, in networks with RNs, multiple wireless links might be established in a chain of links between the UE and the core network, such as the EPC. For example, a UE might wirelessly connect to a RN, which then wirelessly connects to an access node, which then connects to the EPC. Additional RNs or access nodes might also be present in this chain, and the connection to the EPC might even be wireless.

Any time a wireless link is established, signal quality might become an issue due to various wireless channel characteristics, such as the multipath effect and the shadowing effect, that should be taken into consideration when the UE moves around. Low signal quality can hinder performance at the UE, in terms of slowing the reception of data, corrupting data, reducing spectral efficiency, or even causing transmission of data to fail.

For networks without RNs that have only one wireless connection between the UE and the EPC, the selection of an access node is relatively simple. The UE may measure the qualities of the signals from the nearby access nodes, and then select the access node with the best signal quality, or select the access node based on some other criteria based on the signal quality. Therefore, cell selection or reselection may be based on the link quality between the UE and the eNB when UE is in IDLE mode. This technique may also be used for the handover procedure when the UE is in CONNECTED mode.

For networks with RNs and/or multiple wireless connections, the selection of an access node or a RN for communication can be more complex. The reason for additional complexity is because a RN providing the best directly measurable signal quality among access nodes and RNs might not provide the best overall signal quality in terms of moving data back and forth between the UE and the EPC. The overall signal quality may be affected by the signal quality between an RN and an access node. The overall signal quality may also be referred to as the composite signal quality.

The link between a RN and an access node may be referred to as a backhaul link. The signal quality of the backhaul link affects the overall signal quality between the UE and the EPC. For example, even if the signal quality between the UE and RN 1 is very good, if the signal quality between RN 1 and eNB 1 is very low, then the composite signal quality between the UE and eNB 1 is likely to be low. However, even if the signal quality between the UE and RN 2 is mediocre, if the signal quality between RN 2 and eNB 1 is very good, then the composite signal quality between the UE and eNB 1 (through RN 2) may be better than the other composite signal quality between the UE and eNB 1 (through RN 1).

The effect of the backhaul link signal quality on the composite signal quality is not necessarily straightforward. For example, the composite signal quality is not necessarily the lesser of the access link signal quality and the backhaul link signal quality. Techniques for determining the composite signal quality are given below.

As a result of the possible existence of reduced backhaul link signal quality, a UE that chooses (selects, reselects, or hands-over) a RN only based on the access link signal quality may not choose the RN leading to the best composite signal quality between the UE and the EPC. The best overall link might be generated by a different RN with a lower access link signal quality, but which connects to a chain of links having a better composite signal quality. The embodiments described herein provide for techniques for allowing the UE to choose the RN associated with the best composite signal quality, thereby improving data throughput, transmission quality, and spectral efficiency.

FIG. 1 is a diagram of a communication system, according to an embodiment of the disclosure. Communication system 100 represents an architecture of an LTE-A system.

A RN is a device that facilitates communication with an eNB. RNs, generally, can be divided into three groups: layer 1 RNs, layer 2 RNs, and layer 3 RNs. A layer 1 RN may be a repeater that merely retransmits a received signal without any modification other than amplification and possibly slight delay. A layer 2 RN can demodulate/decode a transmission that it receives, re-encode/modulate the result of the decoding, and then transmit the modulated data. A layer 3 RN may have full radio resource control capabilities and can thus function similarly to an access node. The radio resource control protocols used by a RN may be the same as those used by an access node, and the RN may have a unique cell identity typically used by an access node. A "layer x" RN is distinguished from a "Type x" RN. For example, a layer 1 RN is not a Type 1 RN; in fact, a Type 1 RN is functionally similar to a layer 3 RN. Type 1 RNs are described in greater detail below.

For the purpose of this disclosure, a RN is distinguished from an eNB or other access node by the fact that a RN requires the presence of at least one eNB or other access node (and the cell associated with that access node) and possibly other RNs to access other components in a telecommunications system, such as a MME/SGW. Additionally, for the purposes of this disclosure, the term "eNB" is not limited to only an "evolved node-B," but also may refer to any type of access node suitable for communicating with an MME/SGW or a component of an enhanced packet core.

In an example of operation of a RN, UE 102 communicates with MME/SGW 104 via RN 106 and eNB 108. In particular, UE 102 communicates with RN 106, which in turn communicates with eNB 108, which in turn communicates with MME/SGW 104 via an interface, such as the S1 interface identified by the phantom line. However, a UE, such as UE 110, could communicate directly with an eNB, such as eNB 108.

In another embodiment, a UE, such as UE 112, could communicate with a RN, such as RN 114, that itself communicates with two or more different eNBs, such as eNB 108 and eNB 116. The eNB 116 may be in communication with a different MME/SGW, such as MME/SGW 118, via an interface, such as the S1 interface identified by the phantom line. If the RN 114 is connected to eNB 108, then the cell generated by eNB 108 may be said to be the donor cell. In an embodiment, eNB 108 and eNB 116 may communicate with each other, for example, via the X2 interface identified by the line connecting eNB 108 and eNB 116.

The above examples describe eNBs servicing only one or two RNs; however, each eNB may communicate with more or fewer RNs. Other arrangements of the identified components are possible, and more, fewer, different, or additional components may be present.

RNs are one exemplary mechanism that 3GPP LTE-Advanced has used to further evolve the LTE RAN. In LTE-Advanced (LTE-A), relay technology is used to improve average cell throughput and enhance cell coverage. Further, the inclusion of RNs in the LTE-A system is also intended for the purposes of efficiently extending the UE's battery life, of increasing UE throughput, and of extending cell coverage.

One of the issues presented by the inclusion of RNs is that calculating the overall signal quality between the UE and the MME/SGW is complicated by the presence of more than one communication link. For example, while the connection between the MME and the eNB is often a wired link of good quality, the signal qualities of both the link between the UE and the RN and the link between the RN and the eNB may be considered when determining which access node or RN a UE should attempt to connect to or camp on during a mobility procedure. Mobility procedures include cell selection, cell reselection, handover, or more generally, any mobility procedure that UE may perform. In the embodiments described herein, the link between the UE and the RN may be referred to as the access link and the link between the RN and the eNB may be referred to as a backhaul link. However, other names may be used. Additionally, for more complex communications systems, multiple backhaul links may exist if additional RNs are between the UE-accessed RN and the eNB. Still further, multiple backhaul links could potentially exist as well. Other arrangements are also possible, all of which are within the spirit and scope of the present disclosure.

In an example of determining which eNB or RN a UE should connect to, UE 112 is connected to RN 114; however, the UE 112 could connect to or camp on either eNB 108 or eNB 116 via RN 114. To determine which connection presents the optimum overall signal quality, an examination may be made of the signal quality between RN 114 and eNB 108 versus the signal quality between RN 114 and eNB 116.

In another example of determining which eNB or RN a UE should connect to, UE 110 may have two choices. The first choice is to directly connect to the eNB 108 and the second choice is to connect to the RN 106 and then RN 106 connects to the eNB 108. To determine which connection presents the optimum overall signal quality or spectrum efficiency, an examination may be made between these two different connections. The embodiments described herein relate to methods and/or devices for making and/or processing these measurements.

In a particular non-limiting embodiment, any of RN 106, RN 114, RN 120, or RN 122 may be Type 1 RNs. One of the embodiments described herein relates to handling a UE IDLE mode mobility procedure in a Type 1 relay network while considering the backhaul link quality between a donor eNB and the Type 1 RN. Another one of the embodiments described herein relates to handling a UE CONNECTED mode mobility procedure, such as a handover procedure in a Type 1 relay network, while considering the backhaul link quality between a donor eNB and the Type 1 RN. Yet another one of the embodiments described herein relates to handling a UE transiting from IDLE mode to the CONNECTED mode in a Type 1 relay network while considering the backhaul link quality between a donor eNB and the Type 1 RN. In some other embodiments, these RNs might be Type 2 or any of Layer 1, 2, or 3 relays, and the techniques of the present disclosure might be employed in any case.

Figure 2:
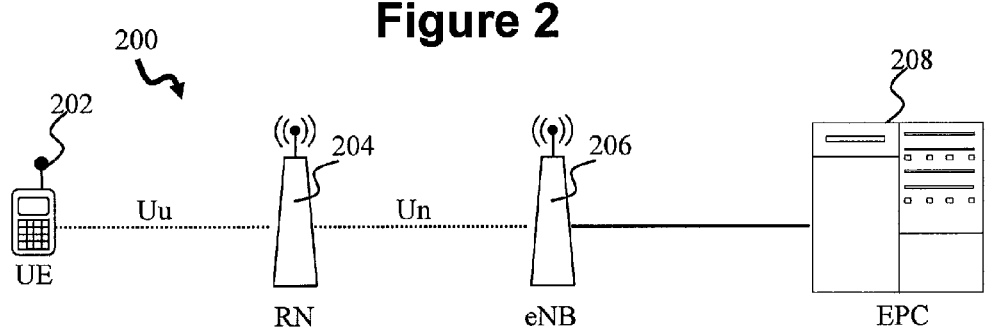
FIG. 2 is a diagram of a communication system, according to an embodiment of the disclosure.

FIG. 2 is a diagram of a communication system, according to an embodiment of the disclosure. Communication system 200 may be a simplified communication system relative to communication system 100 of FIG. 1 and used to more readily illustrate the present systems. In FIG. 2, UE 202 communicates with RN 204, as designated by the phantom line labeled "Uu." RN 204 communicates with eNB 206, as designated by the phantom line labeled "Un." The eNB 206 communicates with EPC 208. Although EPC 208 is represented by a server computer, EPC 208 may be one or more hardware and/or software components or well-known telecommunication systems, possibly linked via a network, that may be used to facilitate communication between UE 202 and some other UE (not shown).

In an embodiment, LTE-A extends earlier LTE releases, such as LTE Release 8 or LTE Release 9, providing support for relaying as a tool to improve a variety of aspects of wireless communication, including but not limited to coverage of high data rates, group mobility, temporary network development, cell-edge throughput and/or provision of coverage in new areas. In an embodiment, the RN 204 is wirelessly connected to a donor cell of a donor eNB 206 via the Un interface. The UE 202 connects to the RN 204 via the Uu interface.

The Un connection may be one of two or more types. One type of Un connection may be "in band." For an "in band" connection, the eNB to RN link may share the same frequency band with direct eNB to UE links within the donor cell. Another type of Un connection may be "out of band." For an "out of band" connection, the eNB to RN link may not operate in the same frequency band as direct eNB to UE links within the donor cell.

The 3GPP specifications such as the TR 36.814 provide that at least Type 1 RNs are part of LTE-A networks. A Type 1 RN may be an in band RN having characteristics described in the following paragraph, although this is not meant to be limiting and a Type 1 RN could instead have an out of band backhaul. A Type 1 RN can be defined such that it has its own physical cell identification and either a partial or complete RRC protocol stack. A Type I RN could be a Layer 3 RN.

A cell controlled by a Type 1 RN may appear to a UE as a separate cell distinct from the donor cell. Each cell may have its own physical cell identification, defined in LTE Release 8, and the RN may transmit its own synchronization signals, reference symbols, and other information. In the context of single cell operation, the UE may receive scheduling information and HARQ feedback directly from the RN, and send its own control channels (such as SR, CQI, and ACK) to the RN. The Type 1 RN may appear as a Release 8 eNB to Release 8 UEs, thereby establishing backwards compatibility. For LTE-A UEs, a Type 1 RN may appear differently than a Release 8 eNB in order to allow for further performance enhancements.

IDLE Mode Mobility Procedures

As described above, the embodiments described herein provide for techniques for improving UE mobility procedures in a Type 1 RN. The embodiments may also be applied to other types of RNs, though for the sake of example only, the procedures for IDLE mode mobility procedures are described with respect to Type 1 RNs.

UE procedures in IDLE mode may include two steps: cell selection, and cell reselection. When a UE is powered on, the UE may select a suitable cell based on IDLE mode measurements and cell selection criteria. The term "suitable cell" as used herein is a cell on which the UE may camp to obtain normal service. A cell may be considered "suitable" if the cell fulfills the cell selection criteria "S", which is defined by the equation:

$$Srxlev > 0$$

Where $$Srxlev = Qrxlevmeas - (Qrxlevmin + Qrxlevminoffset) - Pcompensation$$

These terms are defined as:

| | |
|---|---|
| Srxlev | Cell Selection RX level value (dB) |
| $Q_{rxlevmeas}$ | Measured cell RX level value (RSRP). |
| $Q_{rxlevmin}$ | Minimum required RX level in the cell (dBm) |

| | |
|---|---|
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| Pcompensation | max($P_{EMAX}$ - $P_{UMAX}$, 0) (dB) |
| $P_{EMAX}$ | Maximum TX power level an UE may use when transmitting on the uplink in the cell (dBm) defined as $P_{EMAX}$ in [TS 36.101] |
| $P_{UMAX}$ | Maximum RF output power of the UE (dBm) according to the UE power class as defined in [TS 36.101] |

Regarding the step of cell selection, the UE may use one or both of the following cell selection procedures. One of the two cell selection procedures is initial cell selection. This procedure uses no prior knowledge regarding which RF channels are E-UTRA carriers. The UE may scan all RF channels in the E-UTRA bands according to the UE capabilities to find a suitable cell. On each carrier frequency, the UE might only search for the strongest cell. Once a suitable cell is found, the suitable cell may be selected.

The other of the two cell selection procedures is to use stored information cell selection. This procedure uses stored information of carrier frequencies, and optionally also information on cell parameters, from previously received measurement control information elements or from previously detected cells. Once the UE has found a suitable cell the UE may select the suitable cell. If no suitable cell is found, then the initial cell selection procedure described above may be started.

Later, cell reselection is another step in UE procedures for IDLE mode. When camped on a cell, the UE may regularly search for a more suitable cell according to cell reselection criteria. If a more suitable cell is found, then the more suitable cell may be selected by the UE to camp on.

In the case of E-UTRAN inter-frequency and inter-RAT cell reselection, priority-based reselection criteria may be applied. Absolute priorities of different E-UTRAN frequencies or inter-RAT frequencies may be provided to the UE in the system information or in the RRCConnectionRelease message, or may be provided by inheriting these frequencies from another RAT at inter-RAT cell selection or reselection.

In the case of intra-frequency and equal priority inter-frequency cell reselection, a cell ranking procedure may be applied in order to identify the most suitable cell. The cell ranking criteria may be defined as $R_s$ for serving cells and may be defined as "$R_n$" for neighboring cells (also known as the cell reselection criteria R). These terms may be defined by the following equations:

$$R_s = Q_{meas,s} + Q_{Hyst}$$

$$R_n = Q_{meas,n} + Q_{offset}$$

where

| | |
|---|---|
| $Q_{meas}$ | RSRP measurement quantity used in cell reselections. |
| $Q_{offset}$ | For intra-frequency: Equal to Qoffset$_{s, n}$, if Qoffset$_{s, n}$ is valid, otherwise this equals to zero. For inter-frequency: Equal to Qoffset$_{s, n}$ plus Qoffset$_{frequency}$, if Qoffset$_{s, n}$ is valid, otherwise this equals to Qoffset$_{frequency}$. |
| $Q_{Hyst}$ | Specifies the hysteresis value for ranking criteria, broadcast in serving cell system information |

The UE may perform ranking of all cells that fulfill the cell selection criteria, S. The cells may be ranked according to the R criteria specified above, deriving $Q_{meas,n}$ and $Q_{meas,s}$ and calculating the R values using averaged RSRP results. If a cell is ranked as the most suitable cell, the UE may perform cell reselection to that cell.

Additional restrictions may apply to cell reselection. In an embodiment, the UE may reselect the new cell only if the following two conditions are met. First, the new cell is better ranked than the serving cell during a time interval "$T_{reselectionRAT}$". Second, more than one second has elapsed since the UE camped on the current serving cell.

Type 1 Relay Backhaul Link Quality

In a communication network having RNs, when the UE connects to a RN, two-hop radio communication occurs, rather than a traditional single hop radio communication. For example, communication from a UE to a RN and from the RN to an eNB involves two wireless hops, as opposed to communication from a UE to an eNB, which involves only one hop. Multi-hop communication includes two or more such hops.

As discussed above, the overall link throughput between the eNB and the UE may be not only dependent on the link quality between the RN and the UE, which is the access link, but also may be dependent on the link quality between the eNB and the RN, which is the backhaul link. For example, if the link quality of the access link is very good, but the link quality of the backhaul link is relatively worse, then the overall end-to-end link quality is not good. The link quality is bottlenecked by the backhaul link, in this particular case.

In general, the backhaul link should be relatively good. However, in the case of mobile or nomadic RNs, the backhaul link quality may become worse and may also be time-variant. In one embodiment, an end-to-end SNR for two-hop radio communication may be derived as shown by the following expression. The end-to-end SNR for two-hop or multi-hop communications may be referred to as a composite signal quality, because both the backhaul link signal quality and the access link signal quality are used in determining the end-to-end SNR.

$$SNR_{end-to-end} = \frac{1}{\left(\frac{1}{SNR_{access\_link}} + \frac{1}{SNR_{backhaul\_link}}\right)} \quad \text{(Equation 1)}$$

In equation 1, $SNR_{access\_link}$ is the SNR over the access link, and $SNR_{backhaul\_link}$ is the SNR over the backhaul link. From equation (1), it is seen that both the access link and the backhaul link might contribute equal weight to the overall link quality. In the fixed relay case, $SNR_{backhaul\_link}$ link changes very slowly, mostly due to the shadowing effect change. In the mobile relay case, $SNR_{backhaul\_link}$ may change at a similar rate to $SNR_{access\_link}$.

In one embodiment, the UE may directly measure the $SNR_{access\_link}$. The UE may receive from one or both of the RN or eNB a measurement report of the $SNR_{backhaul\_link}$. Thus, the UE may perform the calculation of $SNR_{end-to-end}$ (the composite signal quality) according to equation 1. Alternatively, any other component in the network, including the RN, eNB, or EPC, may calculate the $SNR_{end-to-end}$ so long as the component either measures or receives a measurement of the values of the $SNR_{access\_link}$ and the $SNR_{backhaul\_link}$. Other techniques may be used for calculating or using the $SNR_{end-to-end}$, such as but not limited to those described below.

A UE connected to a RN might use two-hop bandwidth to complete one transmission, compared with a one-hop transmission if that UE is connected directly to an eNB. A UE might receive a higher SNR from the relay, but the total amount of resources used for two hops, the access link and the backhaul link, could be larger than a single hop transmission on the direct link from the UE to the eNB. From a spectrum efficiency point of view, the UE should select a node that not only provides the best SNR but which also achieves the highest spectrum efficiency. In an embodiment, the bandwidth used on two-hop transmission may be derived as the following expression:

$$BW_{end-to-end} = 1/f(SNR_{access\_link}) + 1/f(SNR_{backhaul\_link})$$

Where the function f represents the Shannon capacity formula:

$$f(SNR) = \log_2(1+SNR)$$

In another embodiment, the function f may be a mapping from the SNR to the particular MCS set based on predefined MCS mapping tables or curves. Each MCS has a corresponding spectrum efficiency value. In another embodiment, the function f may be any mapping function from the SNR to the spectrum efficiency.

The final equivalent end-to-end SNR for two-hop radio communication can be derived to be equation 2, shown below:

$$SNR_{end-to-end} = f^{-1}\left(\frac{1}{BW_{end-to-end}}\right) \quad \text{(Equation 2)}$$

$$= f^{-1}\left\{\frac{1}{\frac{1}{f(SNR_{access\_link})} + \frac{1}{f(SNR_{backhaul\_link})}}\right\}$$

Where the function $f^{-1}$ represents the inverse Shannon capacity formula $f^{-1}(x) = 2^x - 1$, the mapping between the particular MCS set to the SNR based on predefined MCS mapping tables or curves, or any mapping function from the spectrum efficiency to SNR.

In another embodiment, the end-to-end SNR might simply be the minimum of the link quality of the access link and backhaul link. This approximation might be used in some cases because the effective spectrum efficiency that the UE receives might be bottlenecked by the limiting link, which may be either the backhaul link or the access link. In this case, the end-to-end SNR is defined as:

$$SNR_{end-to-end} = \min(SNR_{access\_link}, SNR_{backhaul\_link}) \quad \text{(Equation 3)}$$

In the embodiments described above and hereafter, several methods for determining or calculating backhaul link quality are presented for evaluating the overall composite link quality estimation. Also, the IDLE mode reselection criteria "R", as described above, may be used here as an example for illustration purposes. The embodiments described hereafter may also be applicable to any other UE mobility procedures, such as the handover procedures for the UEs in CONNECTED mode, which may include at least network-directed handover or UE-assisted handover.

Fixed or Configurable RN Offset

In one embodiment, a common RN offset value may be defined and considered in the cell reselection criteria R. From equations (1) and (2), a linear combination of the link quality between the access link and the backhaul link may not exist. However, to make the relationships simpler, a parameter termed $Qoffset_{RN}$ may be defined. In this case, the cell reselection criteria may be refined as follows:

$$R_s = Q_{meas,s} + Q_{Hyst} - Qoffset_{RN}$$

$$R_n = Q_{meas,n} - Qoffset - Qoffset_{RN}$$

where:

| | |
|---|---|
| $Q_{meas}$ | RSRP measurement quantity used in cell reselections. |
| Qoffset | For intra-frequency: Equal to $Qoffset_{s,n}$, if $Qoffset_{s,n}$ is valid, otherwise this equals to zero. |
| | For inter-frequency: Equal to $Qoffset_{s,n}$ plus $Qoffset_{frequency}$, if $Qoffset_{s,n}$ is valid, otherwise this equals to $Qoffset_{frequency}$. |
| $Qoffset_{RN}$ | If the measured cell is the RN, the value equals to $Qoffset_{RN\_BH}$. |
| | If the measured cell is eNB, the value equals 0. |

In this embodiment, the parameter $Qoffset_{RN\_BH}$ may be broadcast by the system information block over the BCCH. Note that although the above $R_s$ and $R_n$ may be used for idle mode cell ranking criteria, they could be generally used to represent other mobility procedure measurements, for example, representing the CONNECTED mode cell quality estimation criteria as well. For example, $R_s$ could be generally used to represent the serving cell quality for any mobility procedure and $R_n$ could be generally used to represent the neighboring cell quality for any mobility procedure. Furthermore, the formulae shown above may be modified in different forms, for example, sometimes in the CONNECTED mode some cell quality estimation criteria, such as the $R_{Hyst}$ or $R_{offset}$ terms, may or may not be present.

In this embodiment, the UE may differentiate between an RN and an eNB, and the UE may apply the modified R criteria for cell reselection. Therefore, this embodiment may not be applicable for Release 8 UEs, but rather for LTE-A (or later) UEs capable of using LTE-A networks.

In a modified embodiment, the $Qoffset_{RN\_BH}$ is captured directly in the $Qoffset_{s,n}$. In this case, the updated $Qoffset_{s,n}$ is the summation of the $Qoffset_{s,n}$ and the $Qoffset_{RN\_BH}$. The eNB may broadcast the $Qoffset_{s,n}$ and the UE may use the updated $Qoffset_{s,n}$ for the cell reselection. Hence, in this embodiment, Release 8 UEs also may be supported. Further, the UE may not need to differentiate an RN from an eNB.

Additionally, different $Qoffset_{RN\_BH}$ may be defined for different RNs. Correspondingly, in the above embodiment, the different $Qoffset_{RN\_BH}$ per RN is captured directly in the $Qoffset_{s,n}$ respectively. $Qoffset_{s,n}$ may be calculated in light of the following four cases.

In the first case, both the serving cell and the neighboring cell are eNBs. In this case, no $Qoffset_{RN\_BH}$ needs to be considered, because the backhaul link quality does not need to be considered.

In the second case, the serving cell is an eNB and the neighboring cell is an RN. In an embodiment, assume one Qoffset defined to be $Qoffset_{RN\_BH1}$. In this case, the backhaul link quality may be considered when the UE reselects the neighboring cell, which is generated by an RN. The value of the $Qoffset_{s,n}$ may be larger by adding $Qoffset_{RN\_BH1}$ to bias cell reselection.

In the third case, the serving cell is generated by an RN. Again, in an embodiment, assume one Qoffset defined to be $Qoffset_{RN\_BH1}$. Furthermore, the neighboring cell is generated by an eNB. In this case, the backhaul link quality may be considered when the UE reselects the neighboring cell, which may be an eNB, but the serving cell is a relay node. The value of $Qoffset_{s,n}$ may be smaller by subtracting $Qoffset_{RN\_BH1}$ to bias cell reselection.

In the fourth case, the serving cell is generated by an RN. Again, in an embodiment, assume one Qoffset defined to be $Qoffset_{RN\_BH1}$. The neighboring cell is also generated by an RN. In this particular embodiment, assume a second Qoffset to be $Qoffset_{RN\_BH2}$. In this case, the backhaul link quality may be considered when the UE reselects the neighboring cell, which may be a relay node, but the serving cell is another relay node. The value of the $Qoffset_{s,n}$ can capture the difference between the two backhaul link qualities. For example, the $Qoffset_{s,n}$ may add $(Qoffset_{RN\_BH2} - Qoffset_{RN\_BH1})$.

An alternative to the above embodiment is to define a new scaling factor $\alpha_{RN}$. This scaling factor may capture the backhaul link effect into the cell ranking procedure. The cell reselection criteria then may be revised as follows:

$$R_s = \alpha_{RN} * Q_{meas,s} + Q_{Hyst}$$

$$R_n = \alpha_{RN} * Q_{meas,n} - Qoffset$$

where:

| | |
|---|---|
| $Q_{meas}$ | RSRP measurement quantity used in cell reselections. |
| Qoffset | For intra-frequency: Equal to $Qoffset_{s,n}$, if $Qoffset_{s,n}$ is valid, otherwise this equals to zero. |
| | For inter-frequency: Equal to $Qoffset_{s,n}$ plus $Qoffset_{frequency}$, if $Qoffset_{s,n}$ is valid, otherwise this equals to $Qoffset_{frequency}$. |
| $\alpha_{RN}$ | If the measured cell is the RN, the value equals to $\alpha_{RN\_BH}$. Otherwise the value equals 1. |

In the above embodiment, the UE may differentiate between the RN and the eNB. Additionally, the UE may also apply the modified R criteria for the reselection. Therefore, the above embodiment might not be applicable for Release 8 UEs, but rather may apply to LTE-A (or later release) UEs capable of using LTE-A networks.

The above embodiments described a new parameter, $\alpha$, which is a scaling factor that captures the backhaul link effect into the cell ranking procedure. The embodiments now turn to transmitting this parameter. The parameter $\alpha_{RN\_BH}$ may be broadcast by the system information block over the BCCH. One embodiment includes modifying the SIB4.

The IE SystemInformationBlockType4 contains neighbor cell-related information relevant only for intra-frequency cell re-selection. The IE includes cells with specific re-selection parameters as well as blacklisted cells. An exemplary SystemInformationBlockType4 information element may be modified as below (additions are underlined and italicized):

```
--ASN1START
SystemInformationBlockType4 ::=    SEQUENCE {
  intraFreqNeighCellList    IntraFreqNeighCellList    OPTIONAL, -- Need OR
    intraFreqBlackCellList  IntraFreqBlackCellList    OPTIONAL, -- Need OR
    csg-PhysCellIdRange     PhysCellIdRange  OPTIONAL, -- Cond CSG
    ...
}
IntraFreqNeighCellList ::=   SEQUENCE (SIZE (1..maxCellIntra)) OF
IntraFreqNeighCellInfo
IntraFreqNeighCellInfo ::=   SEQUENCE {
    physCellId                                        PhysCellId,
    q-OffsetCell                                      Q-OffsetRange,
    alphaRelayBackhaul       alphaRelayBackhaulRange  OPTIONAL,-- Cond Relay
    ...
}
IntraFreqBlackCellList ::=   SEQUENCE (SIZE (1..maxCellBlack)) OF
PhysCellIdRange
-- ASN1STOP
```

The parameter "alphaRelayBackhaul" ($\alpha_{RN\_BH}$) could be any value. One embodiment could be that $0<\alpha_{RN\_BH}\leq 1$. When $\alpha_{RN\_BH}$ is 1, the backhaul link quality may be assumed to be perfect. When the backhaul link quality becomes relatively bad, the $\alpha_{RN\_BH}$ may be decreased. In one example, when the RN is a mobile relay which has a similar channel profile with the UE, $\alpha_{RN\_BH}$ may be equal to 0.5. The parameter $\alpha_{RN\_BH}$ could be a common parameter for all RNs, or could be an RN-specific parameter.

The above embodiment and its alternative possibly may be backward compatible with Release 8 UEs. However, the end-to-end link quality might not be determined accurately, and hence the ranking may not be appropriate. The following embodiments are SNR-based in order to obtain more accurate estimation, but might be applicable only for LTE-Advanced UEs.

Neighboring RN Backhaul Quality List Via the BCCH

In order to consider the backhaul link quality in the overall link quality estimation, a list of the neighboring RN backhaul link quality metric, referred to as $Q_{RN\_BH}$, may be established and sent to the UE via the BCCH from each cell. Each cell might be generated by either an RN or an eNB. In one embodiment, the $Q_{RN\_BH}$ could be the measured RSRP or RSRQ value at the RN node. In another embodiment, the $Q_{RN\_BH}$ could be the average backhaul link SNR or SINR (signal-to-interference-and-noise-ratio) estimation based on the backhaul reference signal. However, the $Q_{RN\_BH}$ need not be limited to the above, but rather could be any form of a quantity representing the backhaul link quality. Based on the received backhaul quality information, the UE may make the appropriate estimation of the end-to-end overall link quality for the cell selection or reselection, for example, to apply the above equations (1) or (2).

Several different embodiments exist to establish the backhaul link quality list described above. In one embodiment, the eNB may estimate $Q_{RN\_BH}$ for each RN connected to the donor eNB based on the uplink transmitted signal, such as the SRS or random access preamble or general uplink transmission signals. The eNB may or may not exchange this information with the neighboring eNBs. Then, the eNB may send the established list to RNs connected to the eNB. All the cells including the eNB and the RNs may broadcast the information via the BCCH, such as in the SIB4 as described above. In addition to the backhaul link quality list corresponding to the RNs attached to the same donor eNB, the eNB and RNs may also broadcast the backhaul link quality list of one or more neighbor eNBs and their associated RNs. The backhaul link quality list of a neighbor eNB and its associated RNs may be sent from the neighbor eNB to the eNB. The eNB may then send the list to its connected RNs.

Alternatively, each RN may report the measured $Q_{RN\_BH}$ to the donor eNB based on a timer, periodically, or an event trigger, such as passing a threshold. Then, the donor eNB may send the resulting list to the eNB's connected RNs. All the cells including the eNB and the RNs broadcast the information via the BCCH in the SIB4.

For the above two cases, the eNB and RNs may also broadcast the backhaul link quality list of one or more neighbor eNBs and their connected RNs. The backhaul link quality list of a neighbor eNB and its connected RNs may be sent from the neighbor eNB to the eNB. The eNB then may send the list to its connected RNs.

Alternatively, the RN may measure its $Q_{RN\_BH}$ and exchange this information with all the neighboring cells using some form of multicast transmission, such as local multicast. The eNB need not perform this multicast. Each cell then may compile a $Q_{RN\_BH}$ list and transmit this list via the cell's broadcast channel. The established list may be delivered to the UEs in the cell using a modified SIB4, as currently presented in 3GPP TS 36.331. An exemplary modified SIB4 is presented below (additions are underlined and italicized):

```
-- ASN1START
SystemInformationBlockType4 ::=    SEQUENCE {
    intraFreqNeighCellList      IntraFreqNeighCellList    OPTIONAL, -- Need OR
    intraFreqBlackCellList      IntraFreqBlackCellList    OPTIONAL, -- Need OR
    csg-PhysCellIdRange         PhysCellIdRange           OPTIONAL, -- Cond CSG
    q-RelayBackhaul             Q-RelayBackhaulRange      OPTIONAL, -- Cond Relay
    ...
}
IntraFreqNeighCellList ::= SEQUENCE (SIZE (1..maxCellIntra)) OF
IntraFreqNeighCellInfo
IntraFreqNeighCellInfo ::=       SEQUENCE {
    physCellId                   PhysCellId,
    q-OffsetCell                 Q-OffsetRange,
    q-RelayBackhaul              Q-RelayBackhaulRange     OPTIONAL, -- Cond Relay
    ...
}
IntraFreqBlackCellList ::= SEQUENCE (SIZE (1..maxCellBlack)) OF PhysCellIdRange
-- ASN1STOP
```

The IE SystemInformationBlockType4 might contain neighbor cell related information relevant only for intra-frequency cell re-selection. The parameter $Q_{RN\_BH}$ may be added to the neighbor cell information if a wireless backhaul exists for that cell. The IE includes cells with specific re-selection parameters, as well as blacklisted cells.

In the case that $Q_{RN\_BH}$ is the average backhaul link SNR estimation, the $Q_{RN\_BH}$ range could be from −10 dB to 20 dB. This range may be in alignment with the geometry range of a regular 3-sector cell.

Based on the measured RSRP/RSRQ value and the received $Q_{RN\_BH}$ on the backhaul link, the UE may determine the overall link quality. One technique for determining the overall link quality is to refine the current cell reselection criteria as follows:

$$R_s = 1/(1/Q_{meas,s} + 1/Q_{BH}) + Q_{Hyst}$$

$$R_n = 1/(1/Q_{meas,n} + 1/Q_{BH}) - Q\text{offset}$$

where:

| | |
|---|---|
| $Q_{meas}$ | RSRP measurement quantity used in cell reselections. |
| Qoffset | For intra-frequency: Equal to Qoffset$_{s,n}$, if Qoffset$_{s,n}$ is valid, otherwise this equals to zero. |
| | For inter-frequency: Equal to Qoffset$_{s,n}$ plus Qoffset$_{frequency}$, if Qoffset$_{s,n}$ is valid, otherwise this equals to Qoffset$_{frequency}$. |
| $Q_{BH}$ | If the measured cell is the RN, the value equals to $Q_{RN\_BH}$. |

The parameter $Q_{RN\_BH}$ may be broadcast by the system information block over the BCCH.

Another embodiment of the new cell reselection ranking formula could be as follows:

$$R_s = 1/(w_1/Q_{meas,s} + w_2/Q_{BH}) + Q_{Hyst}$$

$$R_n = 1/(w_1/Q_{meas,n} + w_2/Q_{BH}) - Q\text{offset}$$

In this embodiment, $w_1$ and $w_2$ are the weighting parameters for the link quality for different hops. A weighting normalization condition may also be applied, e.g., $(w_1+w_2)/2=1$ (other normalization conditions may also apply). For example, if the access link quality is more important, $w_1$ could be larger than $w_2$. Otherwise, $w_1$ could be smaller than $w_2$. By default the following equality may be used: $w_1=w_2=1$.

In yet another embodiment, the new cell reselection ranking formula may be as follows:

$$R_s = f^{-1}(1/(w_1/f(Q_{meas,s}) + w_2/f(Q_{BH}))) + Q_{Hyst}$$

$$R_n = f^{-1}(1/(w_1/f(Q_{meas,n}) + w_2/f(Q_{BH}))) - Q\text{offset}$$

Here, f and $f^{-1}$ have been defined earlier, while $w_1$ and $w_2$ are the weighting parameters for the resources used for different hops. For example, if the access link resource is more important, $w_1$ could be larger than $w_2$. Otherwise $w_1$ could be smaller than $w_2$. By default, $w_1=w_2=1$. In one embodiment, $w_1$ and $w_2$ above may be broadcast by the system information block, such as a SIB4, over the BCCH. In another embodiment, $w_1$ and $w_2$ may be fixed as specified by the 3GPP technical specifications.

In still another embodiment, the new cell reselection ranking formula may be as follows:

$$R_s = Q_{effective,s} + Q_{Hyst}$$

$$R_n = Q_{effective,n} - Q\text{offset}$$

In this embodiment, $Q_{effective,s}$ is min($Q_{meas,s}$, $Q_{BH}$). Additionally, $Q_{efffective,n}$ is min ($Q_{meas,n}$, $Q_{BH}$).

Dedicated RN Backhaul Quality

In another embodiment, in order to consider the backhaul link quality in the overall link quality estimation, dedicated RN backhaul quality may be used. In this case, no need exists to exchange the $SNR_{RN\_BH}$ among the eNB and the RN. Hence, the backhaul traffic related to the $Q_{RN\_BH}$ exchange might not be required. In this case, each RN may measure its $Q_{RN\_BH}$ and transmit this measurement via the broadcast channel. This measurement may be transmitted in a modified SIB4. One embodiment of a modified SIB4 may be as follows (additions are underlined and italicized):

```
-- ASN1START
SystemInformationBlockType4 ::= SEQUENCE {
    intraFreqNeighCellList      IntraFreqNeighCellList     OPTIONAL,--Need OR
    intraFreqBlackCellList      IntraFreqBlackCellList     OPTIONAL, --Need OR
    csg-PhysCellIdRange         PhysCellIdRange            OPTIONAL, -- Cond CSG
    q-RelayBackhaul             Q-RelayBackhaulRange       OPTIONAL, -- Cond Relay
    ...
}
IntraFreqNeighCellList ::= SEQUENCE (SIZE (1..maxCellIntra)) OF
IntraFreqNeighCellInfo
IntraFreqNeighCellInfo ::=     SEQUENCE {
    physCellId                  PhysCellId,
    q-OffsetCell                Q-OffsetRange,
    ...
}
IntraFreqBlackCellList ::= SEQUENCE (SIZE (1..maxCellBlack)) OF PhysCellIdRange
-- ASN1STOP
```

The exemplary IE SystemInformationBlockType4 element presented above contains neighbor cell related information relevant only for intra-frequency cell re-selection. The IE may include cells with specific re-selection parameters, as well as blacklisted cells.

In the case that $Q_{RN\_BH}$ is the average backhaul link SNR estimation, the $Q_{RN\_BH}$ range could be from −10 dB to 20 dB. This range may be in alignment with the geometry range of a regular 3-sector cell.

In the above embodiment, the information broadcast via the BCCH may be much less compared to other embodiments. For example, in the case that $Q_{RN\_BH}$ is the average backhaul link SNR estimation, only 5 bits are needed in SIB4 to deliver this information. In contrast, for the neighboring RN backhaul quality list embodiment described above, and for the example that there are 20 neighboring RNs, 100 bits might be added in SIB4. Although this addition of bits might not be an issue for the SIB4, the savings of bits in the current embodiment still may be beneficial in terms of reducing overhead. However, this embodiment may incur more complicated procedures on the UE side.

For example, the UE may evaluate the cell quality based on the cell ranking formula as follows:

$$R_s = 1/(1/Q_{meas,s} + 1/Q_{BH}) + Q_{Hyst}$$

$$R_n = 1/(1/Q_{meas,n} + 1/Q_{BH}) - Q\text{offset}$$

Or $$R_s = f^{-1}(1/(w_1/f(Q_{meas,s}) + w_2/f(Q_{BH}))) + Q_{Hyst}$$

$$R_n = f^{-1}(1/(w_1/f(Q_{meas,n}) + w_1/f(Q_{BH}))) - Q\text{offset}$$

Or $$R_s = Q_{effective,s} + Q_{Hyst}$$

$$R_n = Q_{effective,n} - Q\text{offset}$$

where $Q_{efffective,s}$ is min($Q_{meas,s}$, $Q_{BH}$) and $Q_{efffective,n}$ is min ($Q_{meas,n}$, $Q_{BH}$).

The UE may use its previously stored $Q_{BH}$ for each corresponding cell when calculating $R_s$ and $R_n$ above. If no $Q_{BH}$ is previously stored for a cell, the UE may ignore the $Q_{BH}$ term in the above equations.

After the best cell is selected, the UE may camp on that best cell and listen to the BCCH. Via the BCCH, the UE may receive the $Q_{RN\_BH}$ for the camped cell.

At this point, there may be two different alternatives. In the first alternative, the UE may not perform cell reselection immediately. Instead, cell reselection may be dependent on the measurement rule defined in 3GPP TS 36.304. The received $Q_{RN\_BH}$ might only apply to the next cell reselection ranking procedure.

In another alternative, the UE may immediately apply the received $Q_{RN\_BH}$ and start the cell ranking procedure again to re-rank the cell quality. If the current serving cell is still the best cell, the UE may stay in the current cell. If a better cell is found, the UE may switch to the new cell.

Hybrid Embodiment

To find a trade-off between the signaling load and cell reselection performance/simplicity, a hybrid of the above embodiments may be used. In this embodiment, each cell generated by an eNB or an RN establishes a partial list of backhaul link quality. Each cell transmits the partial list via the BCCH. For example, the partial list might only contain the RNs inside the same donor cell, or the list might be limited to no more than a certain number of RNs. The limited set of RNs could be those RNs that are closest to the cell that transmits the BCCH.

When the UE receives the list, the UE may apply the revised cell ranking formula when performing the cell-reselection ranking procedure. When the best cell is found, if the $Q_{RN\_BH}$ of the cell is already included in the list, no further action may be needed on the UE side. If the $Q_{RN\_BH}$ of the cell is not included in the list, then there are two different alternatives, as described above at the end of the description of the dedicated RN backhaul quality embodiment.

In an embodiment, the SIB4 may be modified as follows (additions are underlined and italicized):

Cell Barring

In another embodiment, in order to consider the backhaul link quality in the overall link quality estimation, a cell barring technique may be used. Specifically, if the backhaul link quality is inadequate or the cell loading is above certain threshold for a certain time, the relay node could set the cell status to be barred. One embodiment of determining inadequate backhaul link quality could be the backhaul link quality falling below a threshold for a certain time period. Another embodiment of determining inadequate backhaul link quality could be the variance of the backhaul link quality as measured over a certain period of time exceeding a threshold. To set the cell status to be barred, for example, the field "cellBarred" in SIB1 could be set to "barred". In this case, UEs will not select or re-select to this relay cell. Once the backhaul link quality is back to normal and stable or the cell loading is below certain threshold, the relay node could reset the cell status to unbarred. The relay node could inform the neighboring cells generated by a RN or an eNB about the RN barring/unbarring status. In this manner, the neighboring cells could allocate an appropriate amount of resources for PRACH. This embodiment complements the above embodiments, and may be used in combination with the above embodiments.

Another variation on this approach may be for a relay node to modify the ac-BarringFactor and/or ac-BarringTime values contained in the RN's SIB-2. The modification may be based on the backhaul link quality and/or cell loading. These two quantities may be used to control the probability that a particular UE is able to access a cell, and would thus be able to adjust the loading on the relay cell as measured by the number of UEs camping on that cell. Accessing a cell may be similar to transitioning from IDLE to CONNECTED mode, as described in Section 5.3.3.2 of 36.331.

Mobility for UEs in Connected Mode

The above embodiments were described with respect to UEs in IDLE mode. Similar techniques can also be applied to the CONNECTED mode mobility procedure in order to capture the backhaul link quality in a handover decision. Thus,

```
-- ASN1START
SystemInformationBlockType4 ::=        SEQUENCE {
    intraFreqNeighCellList          IntraFreqNeighCellList      OPTIONAL, -- Need OR
    intraFreqBlackCellList          IntraFreqBlackCellList      OPTIONAL, -- Need OR
    csg-PhysCellIdRange             PhysCellIdRange             OPTIONAL, -- Cond CSG
    q-RelayBackhaul                 Q-RelayBackhaulRange        OPTIONAL, -- Cond Relay
    ...
}
IntraFreqNeighCellList ::= SEQUENCE (SIZE (1..maxCellIntra))
    OF IntraFreqNeighCellInfo
IntraFreqNeighCellInfo ::=              SEQUENCE {
    physCellId          PhysCellId,
    q-OffsetCell        Q-OffsetRange,
    q-RelayBackhaul                 Q-RelayBackhaulRange        OPTIONAL, -- Cond Relay
    ...
}
IntraFreqBlackCellList ::= SEQUENCE (SIZE (1..maxCellBlack)) OF PhysCellIdRange
-- ASN1STOP
```

The exemplary IE SystemInformationBlockType4 provided above contains neighbor cell related information relevant only for intra-frequency cell re-selection. The IE includes cells with specific re-selection parameters, as well as blacklisted cells.

In the case that $Q_{RN\_BH}$ is the average backhaul link SNR estimation, the $Q_{RN\_BH}$ range could be from −10 dB to 20 dB. This range may be in alignment with the geometry range of a regular 3-sector cell.

the above embodiments also apply to UEs in CONNECTED mode, such as in handover procedures.

However, the signaling mechanisms may be different. For example, in CONNECTED mode, the above defined parameters used to capture the backhaul link impact may be sent in dedicated signaling to the UE. An example of such dedicated signaling could be RRC messages, such as the measConfig Information Element. The parameters may be updated via the dedicated signaling as well. The UE may capture the backhaul link quality by applying a similar approach to the mobility measurement procedure, as described above.

In another embodiment, possibly only the eNB or the RN may take the responsibility to consider the backhaul link quality during the CONNECTED mode mobility procedure, e.g., a network-directed handover procedure, as opposed to the UE taking this responsibility. In this case, the UE may still behave as a Release 8 UE, and thereby report the measured RSRP of the neighboring cells according to the measurement control signaling. However, the network may consider all the backhaul link quality information and may make the final decision for the handover decision. Although this embodiment possibly may be backward compatible to Release 8 UEs, this embodiment might not provide desired mobility performance because the measurement trigger events on the UE side may not consider the backhaul link quality. Failure to consider the backhaul link quality may cause false measurement reporting if it is event triggered. This embodiment may use periodical measurement reporting from the UE side.

The LTE Release 8 specifications defining the CONNECTED mode measurement event configuration capability either are not able to handle measurement event triggering, or may not handle such triggering properly in cases where including the effects of relay backhaul link quality into the triggering condition is desirable or necessary. In other words, different threshold values may be appropriate for a particular measurement quantity, depending upon whether the cell being measured belongs to an eNB or to a relay node. An alternative approach would be to maintain one single threshold value for event triggering, while having the UE modify the measured quantity for any relay nodes according to one or more of the embodiments described above.

When the UE performs a mobility procedure, the UE should choose the appropriate cell. The appropriate cell is normally the cell with the highest link quality. In a Type I relay network, the overall link quality includes a composite of both the backhaul link quality and the access link quality. The embodiments described above provide several alternatives regarding capturing the backhaul link quality in the mobility procedure. A new offset or a revised cell reselection ranking formula is suggested. The revised formula solution may give a more accurate estimation of the overall link quality, relative to older procedures, while the new offset solution provides simplicity relative to older procedures. Further, several alternatives are provided for revised formulae. A system information block, such as SIB4, may be modified as described above to enable the various embodiments described above.

In the embodiments described above, different components in a wireless network may perform the various functions described above. For example, an eNB and/or a RN could measure the backhaul link signal quality and transmit that information to the UE. The UE could measure the access link signal quality, or the RN/eNB could measure the access link signal quality and then transmit that information to the UE. The UE then may calculate the cell selection criteria according to the equations defined above. In another embodiment, an eNB or RN could maintain a list of neighbor cells and include in that list corresponding signal qualities for the various backhaul links and/or access links, and then transmit that list to the UE for use by the UE in determining cell selection criteria. In yet another embodiment, the RN and/or eNB could receive a measured access link signal quality from the UE, or alternatively directly measure the access link signal quality, and then calculate the composite signal quality according to the techniques described above. In this case, the RN and/or eNB could transmit the composite signal quality to the UE. Still further, the RN and/or eNB could calculate the cell selection or reselection factors and then transmit those factors to the UE for use in cell selection or reselection. Other combinations are possible with respect to which components perform which functions. Further, the above embodiments apply to any other mobility procedures for the UE as well, such as handover procedures.

Figure 3:
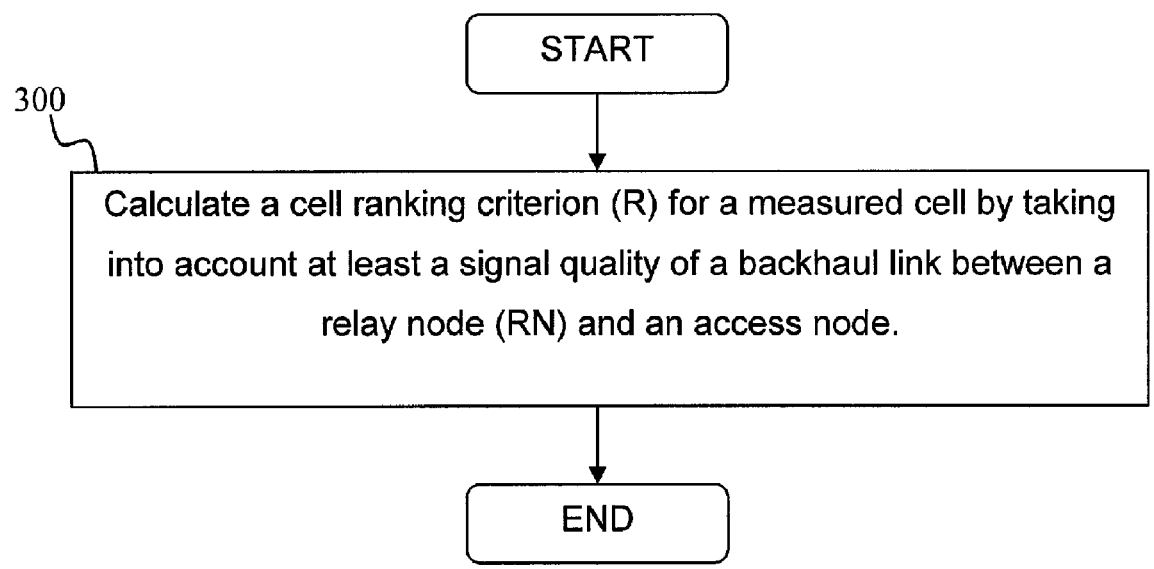
FIG. 3 is a flowchart illustrating a method for calculating a cell ranking criteria, according to an embodiment of the disclosure.
Figure 4:
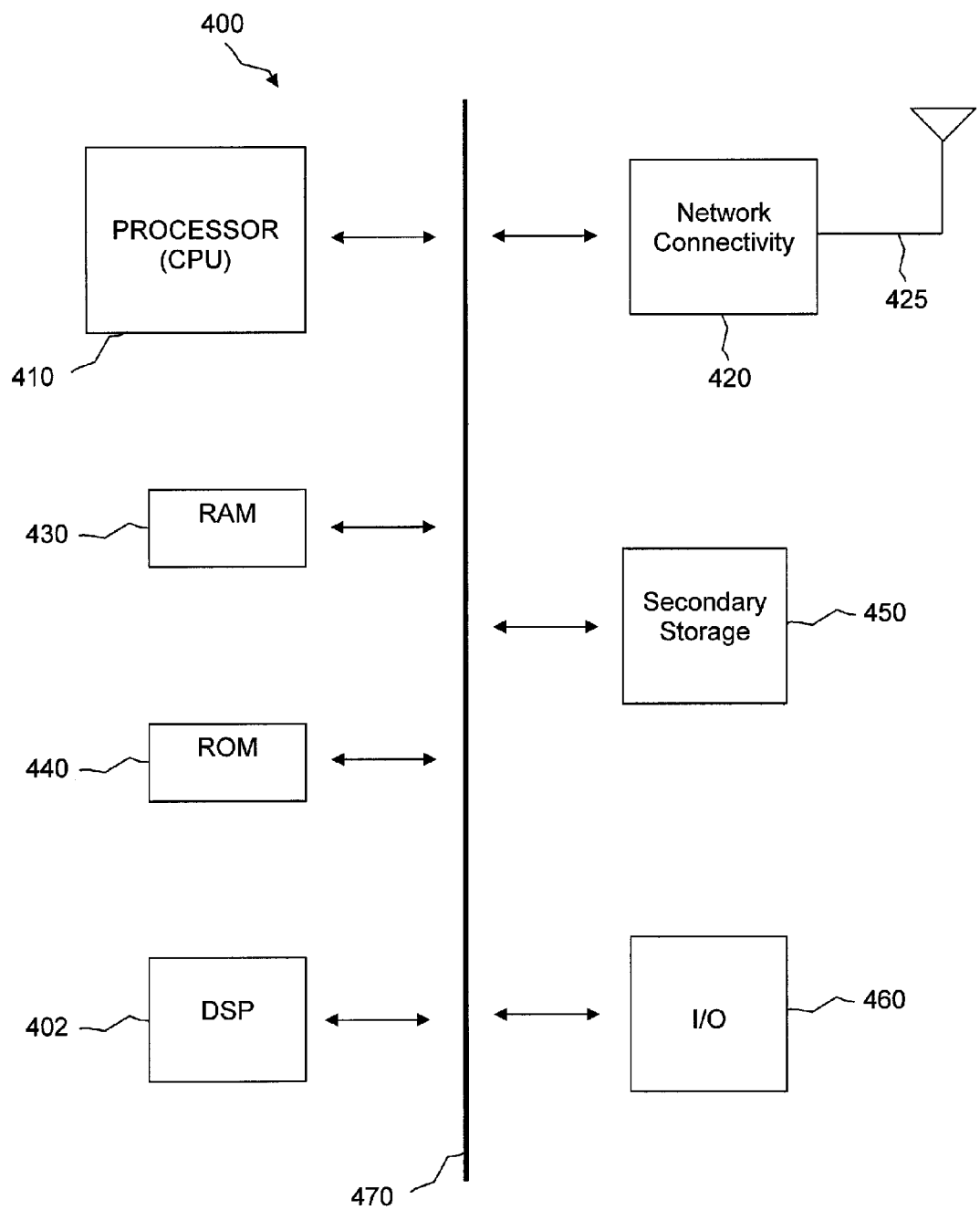
FIG. 4 illustrates an example of a system that includes a processing component suitable for implementing one or more embodiments disclosed herein.

FIG. 3 is a flowchart illustrating a method for calculating a cell ranking criteria, according to an embodiment of the disclosure. Note that the flowchart only shows one of the embodiments in the IDLE mode UEs. Similar flowcharts may be used in CONNECTED mode UEs as well. The method shown in FIG. 3 may be implemented in a device such as a UE, RN, or access node shown in FIGS. 1 and 2, or in a device such as system 400 as shown in FIG. 4 below. The method shown in FIG. 3 may be implemented using the techniques described with respect to FIGS. 1 and 2.

The method includes calculating a cell ranking criterion (R) for a measured cell, wherein calculating is performed by taking into account at least a signal quality of a backhaul link between a relay node (RN) and an access node (block 300). The process terminates thereafter.

The UEs, RNs, and access nodes, as well as other components described above, might include a processing component that is capable of executing instructions related to the actions described above. FIG. 4 illustrates an example of a system 400 that includes a processing component 410 suitable for implementing one or more embodiments disclosed herein. In addition to the processor 410 (which may be referred to as a central processor unit or CPU), the system 400 might include network connectivity devices 420, random access memory (RAM) 430, read only memory (ROM) 440, secondary storage 450, and input/output (I/O) devices 460. These components might communicate with one another via a bus 470. In some cases, some of these components may not be present or may be combined in various combinations with one another or with other components not shown. These components might be located in a single physical entity or in more than one physical entity. Any actions described herein as being taken by the processor 410 might be taken by the processor 410 alone or by the processor 410 in conjunction with one or more components shown or not shown in the drawing, such as a digital signal processor (DSP) 402. Although the DSP 402 is shown as a separate component, the DSP 402 might be incorporated into the processor 410.

The processor 410 executes instructions, codes, computer programs, or scripts that it might access from the network connectivity devices 420, RAM 430, ROM 440, or secondary storage 450 (which might include various disk-based systems such as hard disk, floppy disk, SIM (subscriber identity module) card, or optical disk, or other storage device). An application or other computer usable program code may be stored on any of these devices, or on some other storage device. While only one CPU 410 is shown, multiple processors may be present. Thus, while instructions may be discussed as being executed by a processor, the instructions may be executed simultaneously, serially, or otherwise by one or multiple processors. The processor 410 may be implemented as one or more CPU chips.

The network connectivity devices 420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 420 may enable the processor 410 to communicate with the Internet or one or more telecommunications networks or other networks from which the processor 410 might receive information or to which the processor 410 might output information. The network connectivity devices 420 might also include one or more transceiver components 425 capable of transmitting and/or receiving data wirelessly.

The RAM 430 might be used to store volatile data and perhaps to store instructions that are executed by the processor 410. The ROM 440 is a non-volatile memory device that typically has a smaller memory capacity than the memory capacity of the secondary storage 450. ROM 440 might be used to store instructions and perhaps data that are read during execution of the instructions. Access to both RAM 430 and ROM 440 is typically faster than to secondary storage 450. The secondary storage 450 is typically comprised of one or more disk drives or tape drives and might be used for non-volatile storage of data or as an over-flow data storage device if RAM 430 is not large enough to hold all working data. Secondary storage 450 or may be used to store programs that are loaded into RAM 430 when such programs are selected for execution.

The I/O devices 460 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 425 might be considered to be a component of the I/O devices 460 instead of or in addition to being a component of the network connectivity devices 420.

Thus, the embodiments provide for a device configured to calculate a cell quality ranking criteria, wherein calculating is performed by taking into account at least a signal quality of a backhaul link between a relay node (RN) and an access node. The device may be one of a user equipment (UE), RN, an access node, and a component in a network. The embodiments also include a method for performing the above calculation.

The following documents are hereby incorporated by reference in their entireties: TR 36.814 v. 1.0.0, "Further Advancements for E-UTRA, Physical Layer Aspects" 3GPP; TS 36.300 v V8.9.0 (2009-06), "Evolved Universal Terrestrial Radio Access (E-UTRA) and Evolved Universal Terrestrial Radio Access Network (E-UTRAN); Overall description; Stage 2 (Rel 8)"; R1-092419, "Type-II Relay Reference Signal Transmission and UE Association", RIM; 3GPP TS 36.213 V8.7.0 (2009-06), "Physical layer procedures (Release 8)"; 3GPP TS 36.331 V8.6.0 (2009-06), "Radio Resource Control (Release 8)"; 3GPP TS 36.304 V8.6.0 (2009-06), "User Equipment (UE) procedures in idle mode (Release 8)".

The embodiments contemplate one or more computer readable media. The term "computer readable medium" refers to a tangible storage device which can store data and from which a processor or other electronic device may read data. The embodiments may also be implemented in the form of a processor configured to perform the techniques described herein. A processor may be configured to perform a technique either by programming the processor with software, by physically designing a processor to perform a particular function, such as in the form of an application specific integrated circuit (ASIC), or by using other techniques well known to those skilled in the art.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE) for use in a wireless communication network having at least one relay node (RN), the UE comprising:
    a processor configured to calculate a cell quality ranking criterion for a measured cell by taking into account at least a signal quality of a backhaul link between a RN and an access node, and
    a memory configured to store instructions for calculating the cell quality ranking criterion by the processor,
    wherein calculating the cell quality ranking criterion includes using a common RN offset value ($\text{Qoffset}_{RN}$) wherein the value of ($\text{Qoffset}_{RN}$) is equal to a value, ($\text{Qoffset}_{RN\_bh}$), when the measured cell is generated by the RN, wherein the value of ($\text{Qoffset}_{RN}$) is equal to 0 when the measured cell is generated by the access node, and wherein ($\text{Qoffset}_{RN\_bh}$) is a parameter broadcast by at least one of the RN and the access node, and wherein the parameter is received by the UE.

2. The UE of claim 1 wherein the calculation is performed for at least one of the following:
    a cell selection procedure;
    a cell reselection procedure; and
    a handover procedure.

3. The UE of claim 1 wherein calculating the cell quality ranking criterion includes using one of a fixed RN offset common to each of a plurality of RNs or a configurable RN offset.

4. The UE of claim 1, wherein:
    the cell quality ranking criterion comprises a first value, $R_s$ if the measured cell is a serving cell, wherein the cell quality ranking criterion comprises a second value, $R_n$, if the measured cell is a neighbor cell, wherein $R_s$ is calculated according to the equation:

$$R_s = Q_{meas,s} + Q_{Hyst} - Q\text{offset}_{RN}$$

wherein $R_n$ is calculated according to the equation:

$$R_n = Q_{meas,n} - Q\text{offset} - Q\text{offset}_{RN}$$

wherein ($Q_{meas,\,s}$) and ($Q_{meas,n}$) comprise reference signal receive power (RSRP) measurements used in cell reselection for the serving cell and the neighbor cell, respectively, wherein ($Q_{hyst}$) specifies a hysteresis value for ranking criterion broadcast in the serving cell and received at the UE, and when intra-frequency cell reselection is being considered, (Qoffset) equals ($\text{Qoffset}_{s,n}$) when ($\text{Qoffset}_{s,n}$) is valid; otherwise, (Qoffset) equals zero;

when inter-frequency cell reselection is being considered, (Qoffset) equals (Qoffset$_{s,n}$) plus (Qoffset$_{frequency}$) when (Qoffset$_{s,n}$) is valid; otherwise, (Qoffset) equals (Qoffset$_{frequency}$), and wherein (Qoffset$_{frequency}$) is a value broadcast in the neighbor cell and received at the UE, and further wherein (Qoffset$_{s,n}$) is a value broadcast by the access node and received at the UE; and (Qoffset$_{s,n}$) is a value broadcast by the access node and received at the UE.

5. The UE of claim 4 wherein an updated (Qoffset$_{s,n}$) is replaced with a summation of (Qoffset$_{s,n}$) and (Qoffset$_{RN\_bh}$).

6. The UE of claim 1 wherein a plurality of (Qoffset$_{RN\_bh}$) values are received from a plurality of different RNs, and wherein the plurality of (Qoffset$_{RN\_bh}$) values are different from each other.

7. The UE of claim 4 wherein the serving cell is an access node, wherein the neighbor cell is a RN, and wherein the value of (Qoffset$_{s,n}$) for each RN is increased by adding the respective values of (Qoffset$_{RN\_bh}$).

8. The UE of claim 4 wherein the serving cell is a RN, wherein the neighbor cell is an access node, and wherein the value of (Qoffset$_{s,n}$) is decreased by subtracting the respective values of (Qoffset$_{RN\_bh}$).

9. The UE of claim 4 wherein the wireless network further comprises a second RN, wherein the RN has a first (Qoffset$_{RN\_bh}$) and the second RN has a second (Qoffset$_{RN\_bh}$), and wherein the value of (Qoffset$_{s,n}$) is increased by the difference of the second (Qoffset$_{RN\_bh}$) and the first (Qoffset$_{RN\_bh}$).

10. The UE of claim 1 wherein the cell quality ranking criterion comprises a first value, $R_s$ if the measured cell is a serving cell, wherein the cell quality ranking criterion comprises a second value, $R_n$, if the measured cell is a neighbor cell, wherein $R_s$ is calculated according to the equation:

$$R_s = \alpha_{RN} * Q_{meas,s} + Q_{Hyst}$$

wherein $R_n$ is calculated according to the equation:

$$R_n = \alpha_{RN} * Q_{meas,n} - Q\text{offset}$$

wherein $\alpha_{RN}$ comprises a scaling factor related to the signal quality of the backhaul link, wherein ($Q_{meas,s}$) and ($Q_{meas,n}$) comprise reference signal receive power (RSRP) measurements used in cell reselection for the serving cell and the neighbor cell, respectively, wherein ($Q_{hyst}$) specifies a hysteresis value for ranking criteria broadcast in the serving cell and received at the UE, and wherein (Qoffset) is a value that varies according to whether a frequency used is one of intra-frequency and inter-frequency, and wherein the parameter $\alpha_{RN}$ is broadcast in a system information block over a broadcast control channel (BCCH).

11. The UE of claim 1 wherein the processor is configured to receive a list of RN backhaul link quality metrics relating to a corresponding plurality of RNs.

12. The UE of claim 11 wherein the RN backhaul link quality metrics comprise one of 1) a measured reference signal receive power (RSRP) measured at the corresponding RN and 2) an average backhaul link signal to noise ratio estimation measured at the corresponding RN.

13. The UE of claim 11 wherein the list is received in the form of a system information block.

14. The devise UE of claim 11 wherein the cell quality ranking criterion comprises a first value, $R_s$ if the measured cell is a serving cell, wherein the cell quality ranking criterion comprises a second value, $R_n$, if the measured cell is a neighbor cell, wherein $R_s$ is calculated according to the equation:

$$R_s = 1/(w_1/Q_{meas,s} + w_2/Q_{bh}) + Q_{Hyst}$$

wherein $R_n$ is calculated according to the equation:

$$R_n = 1/(w_1/Q_{meas,n} + w_2/Q_{bh}) - Q\text{offset}$$

wherein ($Q_{meas,s}$) and ($Q_{meas,n}$) comprise reference signal receive power (RSRP) measurements used in cell reselection for the serving cell and the neighbor cell, respectively, wherein ($Q_{bh}$) comprises the RN backhaul link quality metrics, wherein $w_1$ and $w_2$ comprise weighting parameters, wherein ($Q_{hyst}$) specifies a hysteresis value for ranking criteria broadcast in the serving cell and received at the UE, wherein (Qoffset) is a value that varies according to whether a frequency used is one of intra-frequency and inter-frequency.

15. The UE of claim 11 wherein the cell quality ranking criterion comprises a first value, $R_s$ if the measured cell is a serving cell, wherein the cell quality ranking criterion comprises a second value, $R_n$, if the measured cell is a neighbor cell, wherein $R_s$ is calculated according to the equation:

$$R_s = f^{-1}(1/(w_1/f(Q_{meas,s}) + w_2/f(Q_{bh}))) + Q_{Hyst}$$

wherein $R_n$ is calculated according to the equation:

$$R_n = f^{-1}(1/(w_1/f(Q_{meas,n}) + w_2/f(Q_{bh}))) - Q\text{offset}$$

wherein ($Q_{meas,s}$) and ($Q_{meas,n}$) comprise reference signal receive power (RSRP) measurements used in cell reselection for the serving cell and the neighbor cell, respectively, wherein ($Q_{bh}$) comprises the RN backhaul link quality metrics, wherein $w_1$ and $w_2$ comprise weighting parameters, wherein ($Q_{hyst}$) specifies a hysteresis value for ranking criteria broadcast in the serving cell and received at the UE, wherein (Qoffset) is a value that varies according to whether a frequency used is one of intra-frequency and inter-frequency, and wherein (f) represents the Shannon capacity formula [f(SNR) = $\log_2(1+\text{SNR})$] or represents a mapping from the SNR to a particular MCS set based on predefined MCS mapping tables or curves, and where ($f^{-1}$) represents the inverse of the Shannon capacity formula [$f^{-1}(\text{SNR}) = 2^{SNR} - 1$] or an inverse mapping from the SNR to the particular MCS set based on the predefined MCS mapping tables or curves, or an inverse mapping function from the SNR to the spectrum efficiency.

16. The UE of claim 11 wherein the cell quality ranking criterion comprises a first value, $R_s$ if the measured cell is a serving cell, wherein the cell quality ranking criterion comprises a second value, $R_n$, if the measured cell is a neighbor cell, wherein $R_s$ is calculated according to the equation:

$$R_s = Q_{effective,s} + Q_{Hyst}$$

wherein $R_n$ is calculated according to the equation:

$$R_n = Q_{effective,n} - Q\text{offset}$$

wherein ($Q_{effective,s}$) comprises the minimum of ($Q_{meas,s}$) and ($Q_{bh}$), wherein ($Q_{effective,n}$) comprises the minimum of ($Q_{meas,n}$) and ($Q_{bh}$), wherein ($Q_{meas,s}$) and ($Q_{meas,n}$) comprise reference signal receive power (RSRP) measurements used in cell reselection for the serving cell and the neighbor cell, respectively, wherein ($Q_{bh}$) comprises the RN backhaul link quality metrics, wherein ($Q_{hyst}$) specifies a hysteresis value for ranking criteria broadcast in the serving cell and received at the UE, and wherein (Qoffset) is a value that varies according to whether a frequency used is one of intra-frequency and inter-frequency.

17. The UE of claim 1 wherein the signal quality of the backhaul link is received from the RN.

18. The UE of claim 1 wherein the signal quality of the backhaul link is received in the form of a partial list of backhaul link qualities from a plurality of RNs and access nodes, and wherein the partial list comprises one of: those RNs and access nodes inside the same donor cell; a threshold number of RNs and access nodes relative to all measurable RNs and access nodes; or those RNs within a given range to a serving cell serving the UE.

19. The UE of claim 18 wherein the processor is further configured to perform a cell quality ranking procedure based on the signal qualities of the backhaul links received in the partial list, and wherein if a given signal quality of a given backhaul link is included on a previously stored partial list, the UE takes no further action.

20. The UE of claim 1 wherein when the signal quality of the backhaul link is inadequate for a given cell, thereafter the UE will not select or reselect to the given cell.

21. The UE of claim 1 wherein when the signal quality of the backhaul link is inadequate for a given cell, and also when the UE receives a transmission that the given cell is barred, thereafter the UE will not select or reselect to the given cell.

22. The UE of claim 1 wherein the processor is further configured to receive at least one of a barring factor value and a barring time value that are both based on the signal quality of the backhaul link, and wherein the at least one of the barring factor value and the barring time value control a probability that the UE is able to access a given cell.

23. The UE of claim 1 wherein the UE comprises one of a UE, a RN, an access node, and a component in a network.

24. A method of operating a user equipment (UE) for use in a wireless network having at least one relay node (RN), the method comprising:
calculating, by the UE, a cell quality ranking criterion for a measured cell by taking into account at least a signal quality of a backhaul link between a RN and an access node,
wherein calculating the cell quality ranking criterion comprises:
using a common RN offset value ($Qoffset_{RN}$),
wherein the value of ($Qoffset_{RN}$) is equal to a value, ($Qoffset_{RN\_bh}$), when the measured cell is generated by the RN,
wherein the value of ($Qoffset_{RN}$) is equal to 0 when the measured cell is generated by the access node, and
wherein ($Qoffset_{RN\_bh}$) is a parameter broadcast by at least one of a RN and an access node, and
wherein the parameter is received by the UE.

25. The method of claim 24 wherein calculating the cell quality ranking criterion includes using one of a fixed RN offset common to each of a plurality of RNs or a configurable RN offset.

26. The method of claim 24 further comprising:
receiving a list of RN backhaul link quality metrics relating to a corresponding plurality of RNs.

27. The method of claim 24 wherein the signal quality of the backhaul link is received from the RN.

28. The method of claim 24 wherein the signal quality of the backhaul link is received in the form of a partial list of backhaul link qualities from a plurality of RNs and access nodes, and wherein the partial list comprises one of: those RNs and access nodes inside the same donor cell; a threshold number of RNs and access nodes relative to all measurable RNs and access nodes; or those RNs within a given range to a serving cell serving the device.

29. The method of claim 24 further comprising:
when the signal quality of the backhaul link is inadequate or when the cell loading is above a certain threshold for a given period of time for a given cell, avoiding selecting or reselecting to the given cell.

* * * * *

UNITED STATES PATENT AND TRADEMARK OFFICE
CERTIFICATE OF CORRECTION

PATENT NO.        : 8,270,374 B2                         Page 1 of 1
APPLICATION NO.   : 12/572949
DATED             : September 18, 2012
INVENTOR(S)       : Zhijun Cai et al.

It is certified that error appears in the above-identified patent and that said Letters Patent is hereby corrected as shown below:

Claim 14, Column 23, Line 59 replace "The devise UE" with -- "The UE" --

Signed and Sealed this
Fifteenth Day of January, 2013

David J. Kappos
*Director of the United States Patent and Trademark Office*